(12) United States Patent
Shruhan et al.

(10) Patent No.: US 12,095,262 B2
(45) Date of Patent: Sep. 17, 2024

(54) SYSTEM AND METHOD FOR LIMITING INRUSH CURRENT DURING ROBOT CHARGING

(71) Applicant: OMRON Corporation, Kyoto (JP)

(72) Inventors: Andrew Shruhan, Pleasanton, CA (US); Thomas Kent, Pleasanton, CA (US)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/924,317

(22) PCT Filed: May 11, 2021

(86) PCT No.: PCT/US2021/031855
§ 371 (c)(1),
(2) Date: Nov. 9, 2022

(87) PCT Pub. No.: WO2021/236381
PCT Pub. Date: Nov. 25, 2021

(65) Prior Publication Data
US 2023/0187931 A1 Jun. 15, 2023

Related U.S. Application Data

(60) Provisional application No. 63/028,851, filed on May 22, 2020.

(51) Int. Cl.
*H02J 1/10* (2006.01)
*H02H 7/18* (2006.01)
(Continued)

(52) U.S. Cl.
CPC .............. *H02J 1/108* (2013.01); *H02H 7/18* (2013.01); *H02J 1/109* (2020.01); *H02J 7/0045* (2013.01);
(Continued)

(58) Field of Classification Search
CPC .......... H02J 1/108; H02J 1/109; H02J 7/0045; H02J 7/007182; H02J 7/345; H02H 7/18
See application file for complete search history.

(56) References Cited

U.S. PATENT DOCUMENTS

2007/0120525 A1 5/2007 Tsuj
2014/0203764 A1 7/2014 Ireland
(Continued)

OTHER PUBLICATIONS

International Search Report for PCT Application No. PCT/US2021/031855 mailed Aug. 10, 2021 in 2 pages.
(Continued)

*Primary Examiner* — Lincoln D Donovan
*Assistant Examiner* — Alex W Lam
(74) *Attorney, Agent, or Firm* — Knobbe, Martens, Olson & Bear, LLP

(57) ABSTRACT

Features are disclosed for charging a battery using a power supply in series with a diode. A power supply can be connected in series with a diode to restrict an inrush current resulting from connection of the power supply with a battery. In some embodiments, the power supply can further include a plurality of power supplies to restrict the amount of inrush current a single power supply can provide. In other embodiments, the power supply can also include a bypass capacitor that the power supply charges before supplying current to the battery. The power supply can regulate the amount of current that is applied to the battery and prevent inrush current from damaging the battery. Multiple power supplies add to overall reliability.

21 Claims, 7 Drawing Sheets

(51) Int. Cl.
  *H02J 7/00* (2006.01)
  *H02J 7/34* (2006.01)
(52) U.S. Cl.
  CPC ........ *H02J 7/007182* (2020.01); *H02J 7/345* (2013.01)

(56) References Cited

U.S. PATENT DOCUMENTS

2017/0244236 A1\* 8/2017 Wu .................... G06F 1/305
2018/0014709 A1\* 1/2018 O'Brien ............... A47L 9/2884
2018/0115176 A1   4/2018 Ye et al.
2018/0248381 A1   8/2018 Lewis
2020/0044560 A1\* 2/2020 Nagano ................ H02M 3/156

OTHER PUBLICATIONS

Written Opinion of the International Searching Authority for PCT Application No. PCT/US2021/031855 mailed Aug. 10, 2021 in 14 pages.

\* cited by examiner

SYSTEM AND METHOD FOR LIMITING INRUSH CURRENT DURING ROBOT CHARGING

CROSS-REFERENCE TO RELATED APPLICATION(S)

This application claims the benefit of U.S. Provisional Application No. 63/028,851, filed May 22, 2020, which is hereby incorporated by reference in its entirety.

TECHNICAL FIELD

This disclosure generally relates to a docking station, such as for docking and charging mobile robots and limiting inrush current to a battery of a mobile robot when charging with the docking station.

BACKGROUND

Mobile robots are used in various industries to automate tasks typically performed by humans. Mobile robots can include a number of electronics that enable the mobile robots to perform tasks. To enable operation of the mobile robots, the mobile robots can include a battery that provides power to the mobile robots during operation and is charged by a docking station. In one example, a mobile robot can connect to a docking station for charging where, upon connection of the mobile robot, a power supply of the docking station can apply a voltage and current to the battery. The mobile robot can be charged for some time and then resume performing tasks.

SUMMARY

One aspect of the present disclosure is a docking station for limiting an initial surge of current upon connection (i.e., "inrush current") when charging a battery of a mobile robot. The docking station can include a power supply that provides a current to the battery of the mobile robot when charging. The power supply can be connected in series with a diode. The diode can be placed between the power supply and the output of the docking station that may be connected with the mobile robot and/or battery of the mobile robot. The diode can be used to restrict inrush current during an initial connection of the battery of the mobile robot and the docking station by allowing the power supply to come up to the battery voltage slowly. The diode further enables current after the battery of the mobile robot has been connected for a certain time period. By enabling current after a certain time period, the diode can limit the inrush current that is provided to the battery. The diode can further ensure that current does not flow from the battery into the power supply preventing damage to the power supply.

In another aspect of the present disclosure, the power supply of the docking station may be disabled prior to a connection with the battery. The power supply can subsequently be enabled at some time after a connection with the battery. By enabling the power supply after a connection with the battery, the docking station can further limit the inrush current that is provided to the power supply.

In another aspect of the present disclosure, prior to enabling the power supply, the docking station can monitor the voltage of the battery to ensure that a proper (e.g., an acceptable) battery and/or mobile robot is connected to the docking station. Thus, the docking station can ensure that the battery is not damaged by improper charging.

In another aspect of the present disclosure, the docking station can include a plurality of power supplies. The plurality of power supplies can include any number of power supplies. Each power supply can supply a portion of the total current that is provided by the current. By adjusting the number of power supplies, the docking station can be more reliable than from an individual power supply. The plurality of power supplies can be enabled in rapid succession based at least in part upon connection of the docking station and the battery or a received input. Each power supply can be enabled individually in rdpid succession such that the current applied to the battery increases incrementally. The increase in current provided by each power supply can be minimal compared to conventional power supplies and by enabling each power supply individually, the docking station can limit inrush current that is applied to the battery. The battery can further receive increases in current from the docking station incrementally based on the number of power supplies.

In another aspect of the present disclosure, the power supply can include a bypass capacitor between a voltage source of the power supply and an output of the power supply. Prior to outputting any current, the power supply may charge its bypass capacitor. By including a bypass capacitor in the power supply, inrush current is limited at the battery.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION OF THE DRAWINGS

Various examples are depicted in the accompanying drawings for illustrative purposes, and should in no way be interpreted as limiting the scope of the examples. Various features of different disclosed examples can be combined to form additional examples, which are part of this disclosure.

DETAILED DESCRIPTION

Figure 1:
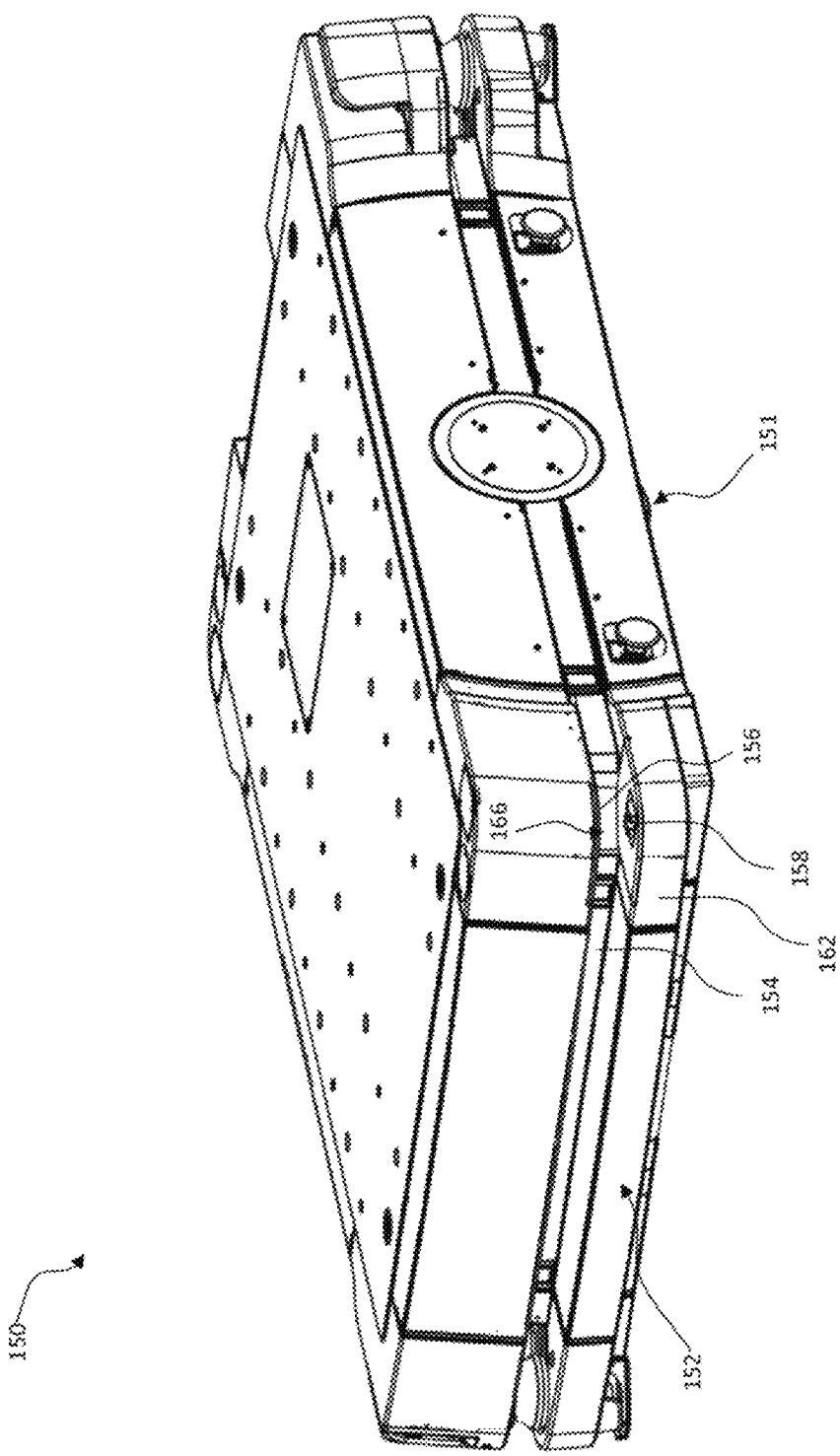
FIG. 1 illustrates an example mobile robot according to some embodiments.

Generally described, the present disclosure relates to a power supply that includes a diode inline (i.e., in series) with the power supply and a battery to be charged by the power supply. As described herein, the use of the diode inline with such a power supply can limit an initial current that is provided or applied to the battery upon connection of the power supply (e.g., the inrush current). By restricting the current of the power supply that is applied during a first time period, the diode can restrict or otherwise limit the current that is applied to the battery for the first time period. Furthermore, use of the diode can reduce the inrush current that is applied to the battery while the voltage comes up and before a control loop in the power supply may react and limit the inrush current. By limiting the inrush current, the power supply can reduce damage to the connections, power supply and/or battery during charging (e.g., damage to fuses). As used herein, the term "diode" may refer to any electronic device or component(s) capable of restricting flow and direction of current. For example, a "diode" may comprise back to back MOSFET transistors used to behave like a diode for controllable voltage drop and time to turn on.

As described herein, a power supply (e.g., a power supply of a docking station) can be used to charge a battery of a device such as, e.g., a mobile robot. The power supply can be connected within a docking station such that when a device is connected via a wired or wireless connection (e.g., via a removable connection) with the power supply, the power supply can charge a battery of the device. Upon connection of the power supply and the device, the docking station can utilize a constant current/constant voltage power supply to charge the battery. For example, after detecting that a device has been connected, a constant current/constant voltage power supply may begin charging the battery with a constant current until the battery reaches a preset level (e.g., five volts) and the current then reduces as the battery is fully charged. In other embodiments, the power supply may have either a constant current power supply or a constant voltage power supply.

In many conventional cases, implementing a general power supply to charge a battery may not provide satisfactory results in particular circumstances or for particular users. Such power supplies may enter a constant current mode after the device is connected with the docking station and may begin providing a constant current to the battery. Upon such connection, the power supply and the battery may have a large difference in voltage due to depletion of the battery during operation of the device. The application of the constant current and large difference in voltage may result in a large inrush current upon connection of the battery and the power supply. In some cases, the large inrush current can damage the system. For example, the inrush current can soften fuses and prematurely cause a fuse to open.

As charging stations and mobile robots proliferate, the demand for faster and more efficient charging has also increased. The present disclosure provides a system for charging a battery with significant advantages over prior implementations. The present disclosure provides systems and methods that enable a reduction in the inrush current applied during charging and initial connection of a battery to a power supply, relative to traditional power supplies, without significantly affecting speed or efficiency when charging. These advantages are provided by the embodiments discussed herein, and specifically by creation of a power supply utilizing a diode to restrict the inrush current that is applied to a battery upon connection and/or enablement of the power supply. Further, the use of multiple power supplies enabled in rapid succession further restricts the inrush current by limiting the amount of current that is applied with each power supply. The use of fast charging power supplies may further allow the power supplies to quickly charge a battery while reducing the inrush current according to the above methods.

As described herein, a power supply may be implemented inline or in series with a diode to restrict the inrush current that is applied to a battery. The power supply and diode may be implemented within a docking station. Upon connection of the battery with the power supply and enablement of the power supply, the diode may restrict current from flowing from the power supply to the battery based on the voltage of the power supply and/or the battery. Further, the diode may restrict current from flowing due to a difference in voltage between the power supply and/or the battery. At a subsequent time, the diode may enable current to begin flowing from the power supply to the battery based on the voltage of the power supply and/or the battery. Further, the diode may restrict current from flowing due to a difference in voltage between the power supply and/or the battery. Thus, where such a diode and power supply are implemented, the diode may prevent an inrush current from being applied to the battery upon connection of the power supply and the battery. The diode may restrict current from flowing to the battery upon connection of the battery with the power supply and may enable the current to flow to the battery after the battery and the power supply have been connected for a time period. For example, a diode may prevent current from flowing from the power supply to the battery for the first 10 milliseconds ("ms") of a connection of the battery and the power supply; after the battery and the power supply have been connected for 10 ms, the diode may enable the current to flow. The time period that a diode restricts current from flowing may be based on the voltage of the battery and/or the power supply. The power supply may be disabled prior to the connection of the power supply and the battery. Upon connection, of the power supply and the battery, the diode may further restrict current from flowing from the battery to the power supply before the power supply has been enabled.

As described herein, a power supply may be implemented with a bypass capacitor that is used to restrict the current supplied by the power supply. As the power supply is enabled, the power supply may charge the bypass capacitor prior to supplying the current to the diode. The bypass capacitor may be charged to a set voltage by the power supply during which the bypass capacitor may restrict current from flowing from the power supply to the battery. When the bypass capacitor is charged to the set voltage, the bypass capacitor may then enable current to flow from the power supply to the battery. Thus, the bypass capacitor may further prevent inrush current from being applied to the battery.

Further, multiple power supplies may be used to charge a battery to restrict the inrush current that is applied to the battery. Each power supply may be implemented with a respective diode and a respective capacitor. Each power supply may be disabled prior to a connection with a battery. Upon connection with the battery, each power supply may subsequently be enabled at different intervals. For example, a first power supply may be enabled during a first interval, a second power supply may be enabled during a second interval, etc. The power supplies may be enabled such that the total number of enabled power supplies grows iteratively until each power supply has been enabled and connected to the battery. The power supplies may be configured to collectively provide the same current that a conventional power supply may provide. For example, a conventional power may supply twelve amps and, in a comparable system with twelve power supplies, each power supply may supply one amp. Thus, where multiple power supplies are implemented, each power supply may supply a reduced current to the battery. As each power supply is enabled in rapid succession, a reduced inrush current may be provided to the battery at any given time (e.g., as a power supply is providing 1 amp of current instead of 12 amps of current). Thus, whereas a conventional power supply may supply a large current at one interval, power supplies as disclosed herein can achieve a lower inrush current as multiple smaller currents, comparatively, are supplied at multiple intervals. This lower inrush current can reduce damage to the power supply and/or battery and can increase efficiency of the system. An added benefit of multiple power supplies is reliable power with the ability to still charge a battery when one supply is disabled or is being serviced.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Mobile Robots

FIG. 1 shows an example mobile robot 150, according to one embodiment. The mobile robot 150 can include one or more wheels 151, a front face 152 that forms a receiving interface 154 for connecting to a docking station (not shown in FIG. 1). The mobile robot 150 can include a first electrical contact 156 and a second electrical contact 158 as well as an actuator 162 for charging with a docking station. The first electrical contact 156 may include a plurality of connectors, and/or the second electrical contact 158 may include a plurality of connectors. The mobile robot 150 can also include one or more magnets 166 near and/or within the receiving interface 154.

Robots, such as the mobile robot 150 described herein, may require charging from time to time. The mobile robot 150 may include an onboard battery, but this battery may be depleted through use and/or simply over time. Battery charging systems may provide a hands-free option for the mobile robot 150 to recharge its power storage efficiently.

System Overview

Figure 2A:
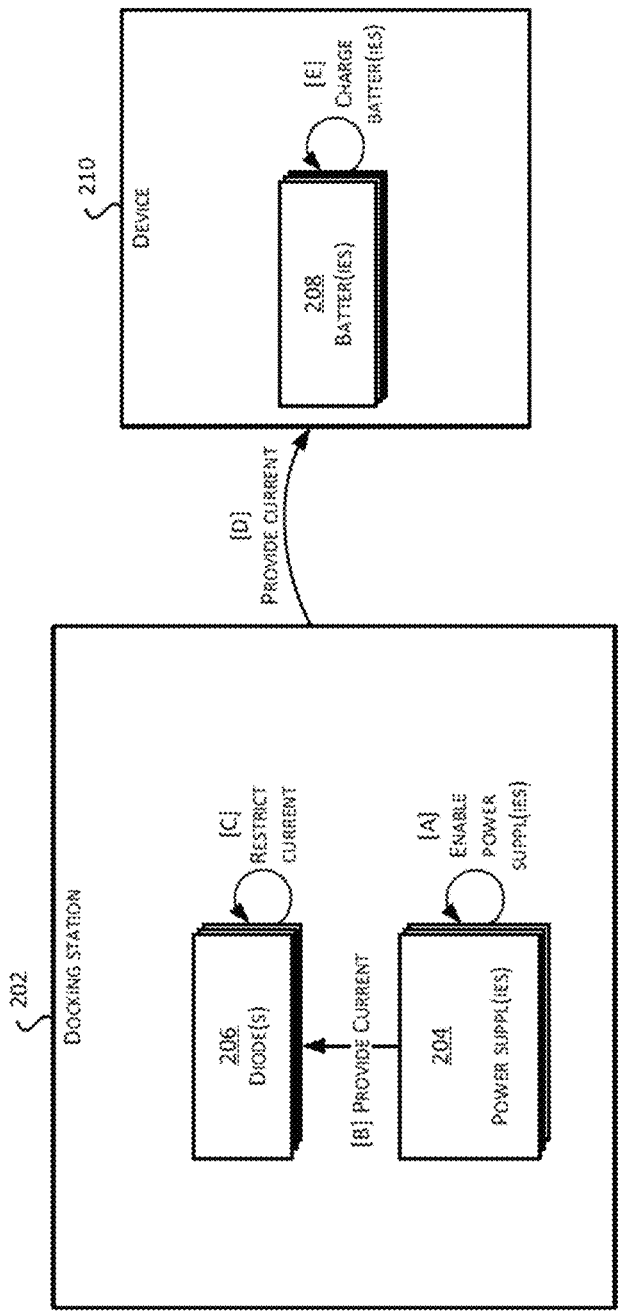
FIG. 2A depicts a schematic diagram of a docking station, including a power supply and a diode in accordance with aspects of the present disclosure.

FIG. 2A illustrates an example environment in which a battery charging system 200A may be implemented according to some embodiments. A docking station 202 may be configured to charge a number of devices. The docking station 202 may be configured to charge the devices via wireless or wired charging. The docking station 202 may provide constant voltage charging, constant current charging, constant voltage/constant current charging, taper current charging, pulsed charging, burp charging, IUI charging, trickle charging, float charging, random charging, and/or any other type of charging. The docking station 202 may further charge a device at a set rate. For example, the docking station 202 may charge a device at a 0.5 charge-rate. The docking station 202 may be configured according to any known charger implementations. For example, the docking station 202 may include a simple charger, a fast charger, a three stage charger, an induction-powered charger, an intelligent charger, a solar charger, a timer-based charger, a trickle charger, and/or any other charger.

The docking station 202 may receive a device 210 for charging. The docking station 202 may receive the device 210 via an electrical connection between the docking station 202 and the device 210. In some embodiments, the docking station 202 and the device 210 may not be electrically connected (e.g., when the docking station 202 is an induction-powered charger). An electrical contact of the docking station 202 may connect with an electrical contact of the device 210. The docking station 202 may be configured to determine when the device 210 has been connected with the docking station 202 based at least in part on the electrical contacts of the docking station 202. In some embodiments, the docking station 202 may use one or more other sensors (e.g., a proximity sensor) to determine that a device 210 has been connected to the docking station 202. In some embodiments, the docking station 202 may include one or more target charge pads configured to receive the device 210 and charge the device 210 via a wireless connection.

The docking station 202 may include various components for providing the features described herein. In some embodiments, the docking station 202 may include one or more power supplies 204 to supply power to the device 210 when charging the device 210. The one or more power supplies 204 may receive an indication that the docking station 202 has been connected with a device 210 and generate current to charge the device 210. The one or more power supplies 204 may be connected to a wall outlet and may receive a voltage from the wall outlet, generator or other similar power source. The one or more power supplies 204 may include one or more transformers, rectifiers, filters, and regulators for transforming or performing operations on a received voltage. Further, the one or more power supplies 204 may receive the voltage from the wall outlet (e.g., 240 Volts Alternating Current ("AC")) and use a transformer to reduce the voltage (e.g., 12 Volts AC). Further, the one or more power supplies 204 may transform the voltage from one format (e.g., AC voltage) into another format (e.g., DC voltage). The voltage may be transformed to an acceptable level and format for a device attached to the docking station 202. In some embodiments, the one or more power supplies 204 may correspond to one or more removable battery packs each containing one or more battery modules. Further, the one or more battery modules may comprise lithium or other battery chemistries as well, such as, e.g., lead-acid. The one or more power supplies 204 may further be located in a remote power electronics cabinet corresponding to a portion of the docking station 202.

The docking station 202 may further include one or more diodes 206 to restrict current supplied by the one or more power supplies 204 during an initial time period. The one or more diodes 206 may be electronically connected inline with the one or more power supplies 204. The one or more diodes 206 may receive current from the one or more power supplies 204 during a first time period and restrict the current from being provided to the device 210. The one or more diodes 206 may subsequently enable current to flow from the one or more power supplies 204 during a subsequent time period. In some embodiments, the docking station 202 may not include the one or more diodes 206 and the one or more diodes 206 may be implemented outside of the docking station 202.

The docking station 202 may be connected to the device 210. The docking station 202 may be electrically connected or coupled to the device 210 to enable charging of the device 210. The docking station 202 and the device 210 may be configured for connection such that the device 210 can engage and disengage with the docking station 202 for charging. For example, the device 210 may engage with the docking station 202 when the device 210 requires a charge and may disengage with the docking station 202 when the device 210 is fully or partially charged. Further, the device 210 may be configured to dock within the docking station 202 and the docking station 202 may be implemented as a port configured to receive the device 210. One or more components of the docking station 202 may be configured to mate with one or more components of the device 210 when docking. In some implementations, the device 210 may be configured to automatically dock or electronically connect with the docking station 202. For example, where the device 210 is a mobile robot, the mobile robot can automatically dock within the docking station 202 under certain circumstances, such as a battery being depleted or the mobile robot completing a task. In other implementations, the device 210 may be manually docked or electronically connected with the docking station 202. For example, the device 210 can be manually placed into electronic connection with the docking station 202.

In some implementations, the docking station 202 and the device 210 may be in wireless communication. The docking station 202 and the device 210 may communicate over a network. The network may include any viable communication technology, such as wired and/or wireless modalities and/or technologies. The network may include any combination of Personal Area Networks ("PANs"), Local Area Networks ("LANs"). Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof. The network may include, and/or may or may not have access to and/or from, the internet. The docking station 202 and the device 210 may communicate a status of a battery, and a corresponding charge of the battery. For example, the device 210 may communicate with the docking station 202 when the battery needs to be recharged. Further, the device 210 may provide an indication that charging of the battery is imminent and prepare the docking station 202 for charging.

The device 210 may be any device that includes one or more rechargeable batteries. For example, the device 210 may be a mobile robot, a non-mobile robot, or any other electronic device. In some implementations, the device 210 may be one or more batteries that may be connected with the docking station 202. The device 210 may include various components for providing the features described herein. In some embodiments, the device 210 may include one or more batteries 208 to power the device 210 during operation. The one or more batteries 208 may be any type of batteries. For example, the one or more batteries 208 may be lithium-ion batteries, lithium-ion polymer batteries, nickel-metal hydride batteries, lead acid batteries, or another type of rechargeable batteries. The one or more batteries 208 may provide a quasi-uniform voltage to the device 210 for a certain time period. For example, the one or more batteries 208 may provide five volts for three hours to the device 210. As the one or more batteries 208 power the device 210, the one or more batteries 208 may subsequently be discharged. As the one or more batteries 208 gradually discharge, the one or more batteries 208 may reach a fully discharged state where the one or more batteries 208 are no longer capable of powering the device 210. The one or more batteries 208 may subsequently be recharged by a power supply or charging device. To recharge and continue operations, the one or more batteries 208 may require a voltage and current to be applied to the one or more batteries 208. The one or more batteries 208 may be recharged for a time period before they reach a fully recharged state. The one or more batteries 208 may subsequently be discharged and recharged numerous times over the lifecycle of the one or more batteries 208.

With reference to an illustrative embodiment, at [A], the docking station 202 can enable the one or more power supplies 204. By enabling the one or more power supplies 204, the docking station 202 can enable the one or more power supplies 204 to begin generating voltage and current. The one or more power supplies 204 may be enabled via a gradual or linear curve. For example, one or more of the voltages and/or currents may gradually increase as the one or more power supplies 204 are enabled. The enabling of the one or more power supplies 204 may be based at least in part on a connection of the docking station 202 and the device 210. The docking station 202 may be configured to sense that a device 210 has been connected with the docking station 202 and subsequently enable the one or more power supplies 204. In some embodiments, the one or more power supplies 204 may be enabled by a user either remotely or through a direct interaction with the docking station 202. For example, a user may set the schedule at which the one or more power supplies 204 are enabled or may manually enable the one or more power supplies 204. In other embodiments, the docking station 202 may determine an ideal schedule or rate to enable the one or more power supplies 204. Prior to the enablement of the one or more power supplies 204, the one or more power supplies 204 may be disabled. The one or more power supplies 204 may be disabled based at least in part on a disconnection of the docking station 202 and the device 210. In some embodiments, the one or more power supplies 204 may be disabled after a certain time period. For example, the one or more power supplies 204 may monitor the time that an individual power supply has been enabled and disable the power supply after it has been enabled for a certain time period (e.g., ten minutes). An added benefit of having other power supplies idled is saving energy.

At [B], after the one or more power supplies 204 are enabled, the one or more power supplies 204 can generate and provide a current to the one or more diodes 206. The one or more power supplies 204 can send the current as an electronic signal to the one or more diodes 206 via a wired connection between the one or more power supplies 204 and the one or more diodes 206. The one or more power supplies 204 may further provide a corresponding voltage to the one or more diodes 206.

At [C], upon receiving the current from the one or more power supplies 204, the one or more diodes 206 may restrict the current for a first time period. The one or more diodes 206 may each include a depletion region that prevents current from flowing across the one or more diodes 206. The depletion region may prevent the current from flowing from a first side of the one or more diodes 206 to a second side of the one or more diodes 206. In some embodiments, a minimal leakage current may flow through the one or more diodes 206. The one or more diodes 206 may further include a voltage drop across the depletion region. The one or more diodes 206 may restrict the current based at least in part on the voltage drop across the one or more diodes 206. Further, the one or more diodes 206 can restrict the current while the voltage drop across the one or more diodes 206 increases from an initial voltage to a subsequent voltage. For example, the one or more diodes 206 can restrict the current from flowing when the voltage across the one or more diodes 206 is between 0 and 0.7 volts. The voltage drop across the one or more diodes 206 can gradually increase as the one or more power supplies 204 increases the voltage supplied to the one or more diodes 206. The one or more diodes 206 can therefore restrict the current for a time period based on the voltage across the one or more diodes 206.

At [D], the one or more diodes 206 may enable the current provided by the one or more power supplies 204 at a subsequent time period. The voltage drop across the one or more diodes 206 may reach a set voltage at a subsequent time period based upon the increase in voltage supplied by the one or more power supplies 204. For example, about 10 ms after the one or more power supplies 204 have been enabled, the voltage drop across the depletion region of the one or more diodes 206 may reach about 0.7 volts and the one or more diodes 206 may begin transmitting current across the diode. As the current is transmitted across the one or more diodes 206, the current may be provided by the docking station 202 to the device 210. The current may be delivered via a wired or wireless connection to the device 210. For example, the current may be delivered to the device 210 via one or more electrical connections between the docking station 202 and the device 210.

At [E], the device 210 receives the current and provides the current to the one or more batteries 208. The one or more batteries 208 may utilize the provided current to recharge a depleted battery of the one or more batteries 208. The one or more batteries 208 may be charged according to charging methods for the corresponding type of battery. For example, where the one or more batteries 208 are lithium-ion batteries, the one or more batteries 208 may be charged via constant current/constant voltage charging. The one or more batteries 208 may include multiple cells across the one or more batteries 208 and each cell may be recharged to a set voltage. In some implementations, the current supplied to the one or more batteries 208 may cause electrons or ions to flow in a cell of the one or more batteries 208 and, as the electrons or ions flow, recharge the one or more batteries 208. The one or more batteries 208 may be recharged according to a charge rate. For example, the one or more batteries 208 may recharge at a rate of about 1 amp per hour. The set voltage may correspond to a voltage threshold and, upon reaching the voltage threshold, the one or more batteries 208 may be designated as fully charged and the connection between the one or more batteries 208 and the docking station 202 may be terminated. The docking station 202 may retain the one or more batteries 208 at a nominal voltage. For example, the docking station 202 may retain the one or more batteries 208 at about 50% voltage.

Charging Systems with a Power Supply and Diode

Figure 2B:
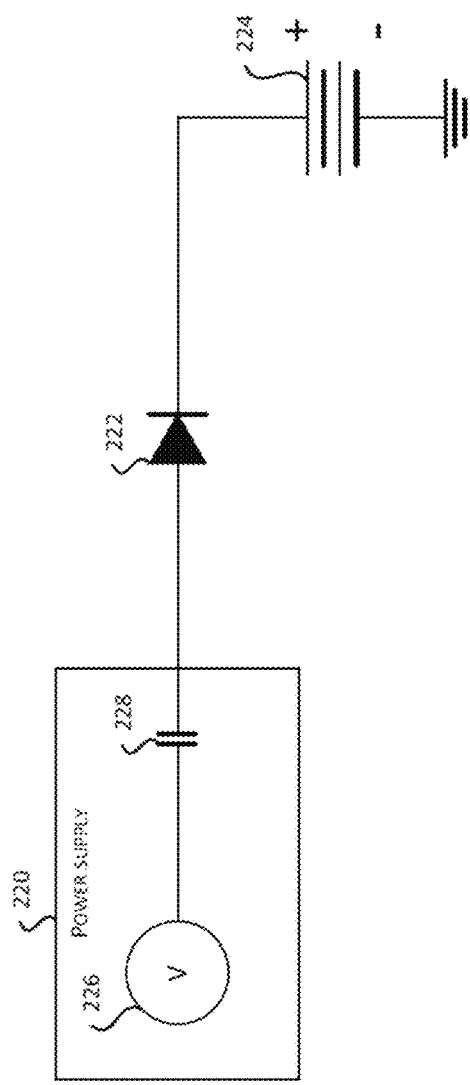
FIG. 2B depicts an individual power supply for charging a battery according to some embodiments.

FIG. 2B illustrates an example configuration of a charging system 200B including an individual power supply 220 according to some embodiments. The individual power supply 220 may include various components to charge a device. The individual power supply 220 may include one or more of a voltage source 226 and a capacitor 228. The individual power supply 220 may be in electronic communication with one or more of a diode 222 and a battery 224. The individual power supply 220 may charge the battery at a time subsequent to connection of the battery 224 while limiting or restricting the amount of inrush current that is provided or applied to the battery 224.

The individual power supply 220 may include a voltage source 226 configured to generate a voltage and provide the voltage to a load connected with the voltage source 226. The voltage source 226 may also generate a current and provide the current to the load. The voltage source 226 may generate a voltage according to known implementations. For example, the voltage source 226 may generate an AC voltage or a DC voltage. In some implementations, the voltage source 226 may be one or more components configured to receive a first voltage and generate a second voltage. The voltage source 226 may be configured to perform one or more operations on a first voltage received by the voltage source 226 such as a transformation, a rectification, etc.

In some implementations, the individual power supply 220 may include a capacitor 228. The capacitor 228 may receive a current generated by the voltage source 226 and may be charged based on the received current. The capacitor 228 may include multiple plates that, upon receiving a current, store electrical energy. The capacitor 228 may restrict the amount of current and/or voltage that may flow through or bypass the capacitor 228 when the capacitor 228 is being charged upon initialization of the individual power supply 220 and/or the voltage source 226. For example, as the capacitor 228 charges to a set voltage, the capacitor 228 restricts the amount of current that flows across the capacitor 228. Upon reaching the set voltage, the diode 222 allows current to begin to from the capacitor 228. One skilled in the art will recognize that by restricting the amount of current that flows from the voltage source 226, the capacitor 228 may further limit the inrush current that is provided to a load. The capacitor 228 may be implemented as any type of capacitor. For example, the capacitor 228 may be a bypass capacitor. The capacitor 228 may comprise any materials such as glass, ceramic, plastic, etc. In other implementations, the individual power supply 220 may not include a capacitor 228. The individual power supply 220 may generate a voltage and current that is subsequently provided to other components of the charging system 200B.

The individual power supply 220 may be in electrical communication with a diode 222. The diode 222 may be wired with the individual power supply 220. In some implementations, the diode 222 and the individual power supply 220 may be housed within a corresponding housing such as a docking station. In other embodiments, the diode 222 may be housed in a first device that is electronically connected with the individual power supply 220 that may be housed in a second device. The diode 222 may be a thermionic diode, a semiconductor diode, or any other type of diode.

The diode 222 may be a diode biased in either the forward or reverse direction and may restrict the current that may flow in one direction prior to enablement of the individual power supply 220. In some implementations, the battery 224 may correspond to a greater voltage than the individual power supply 220. For example, when the battery 224 is not completely depleted and the individual power supply 220 is disabled, the battery 224 voltage may be greater and current may attempt to flow from the battery 224 to the individual power supply 220. The diode 222 may be implemented to prevent such current flow from the battery 224 to the individual power supply 220 before the individual power supply 220 has been enabled based on the bias of the diode 222. For example, the diode 222 may be implemented as a forward-bias diode to prevent current from flowing from the battery 224 to the individual power supply 220. One skilled in the art will recognize that by limiting the direction that current can flow, namely preventing current from flowing from the battery 224 to the individual power supply 220, the diode 222 can prevent damage to the individual power supply 220.

By implementing the diode 222 inline with the individual power supply 220 and the battery 224 prior to enablement of the individual power supply 220, the charging system 200B can further ensure that a proper or compatible battery has been connected to the system 200B. The diode 222 can monitor a current or voltage from the battery 224 to ensure that the battery 224 meets certain specifications associated with the charging system 200B. For example, the charging system 200B may support batteries with certain charging capabilities, voltages, currents, or other electronic capabilities. The charging system 200B can be configured to compare one or more values of the battery 224 with the electronic capabilities prior to enablement of the individual power supply 220. In the event that the charging system 200B determines that an improper or incompatible battery is connected to the charging system 200B, the charging system 200B may not enable the individual power supply 220. In the event that the charging system 200B determines that a proper battery is connected to the charging system 200B, the charging system 200B may enable the individual power supply 220. Therefore, by implementing the diode 222, the charging system 200B can perform a battery check to ensure the battery 224 is proper.

After enablement of the individual power supply 220, the diode 222 may receive a current and a voltage via an electrical communication with the individual power supply 220. The individual power supply 220 may be enabled at a first time and subsequently provide the current and voltage to the diode 222. The diode 222 may be configured to restrict or limit the current that may pass through the diode 222 during a time period based on the voltage of the individual power supply 220. The diode 222 may restrict the current that passes through the diode 222 when the voltage applied to the diode 222 is within a certain voltage range. For example, the diode 222 may restrict current from passing through the diode 222 when the voltage applied to the diode 222 is between about 0 and about 0.7 volts. The voltage applied to the diode 222 may be equal to or based at least in part on the voltage of the individual power supply 220. At this time, minimal current may be passed from the individual power supply 220 to the battery 224. As the voltage of the individual power supply 220 increases and the corresponding voltage of the diode 222 increases, the diode 222 may begin to enable current to pass through the diode 222. For example, when the voltage applied to the diode 222 reaches 0.8 volts, the diode 222 may begin transmitting current across the diode 222. Subsequently, current may be passed from the individual power supply 220 to the battery 224. The initial restriction of current by the diode 222 may correspond to a first time period and the subsequent enablement of current by the diode 222 may correspond to a second time period. The initial restriction of current by the diode 222 may further limit the inrush current that is provided to the battery 224.

The battery 224 may be in electrical communication with the diode 222 and the individual power supply 220 through the diode 222. In some implementations, the battery 224 may be housed in a housing separate from the individual power supply 220 and/or the diode 222 such as a mobile robot. In other implementations, the battery 224 may be housed in the same housing as one or more of the individual power supply 220 and/or the diode 222. The battery 224 may receive the current generated by the individual power supply 220 and enabled by the diode 222 during a subsequent time period. The battery 224 may receive an initial current after the individual power supply 220 has been enabled for a first time period thus decreasing the inrush current that is provided to the battery 224. The battery 224 may subsequently be charged based on the supplied current and corresponding voltage.

Charging Systems with Multiple Power Supplies and Multiple Diodes

Figure 3:
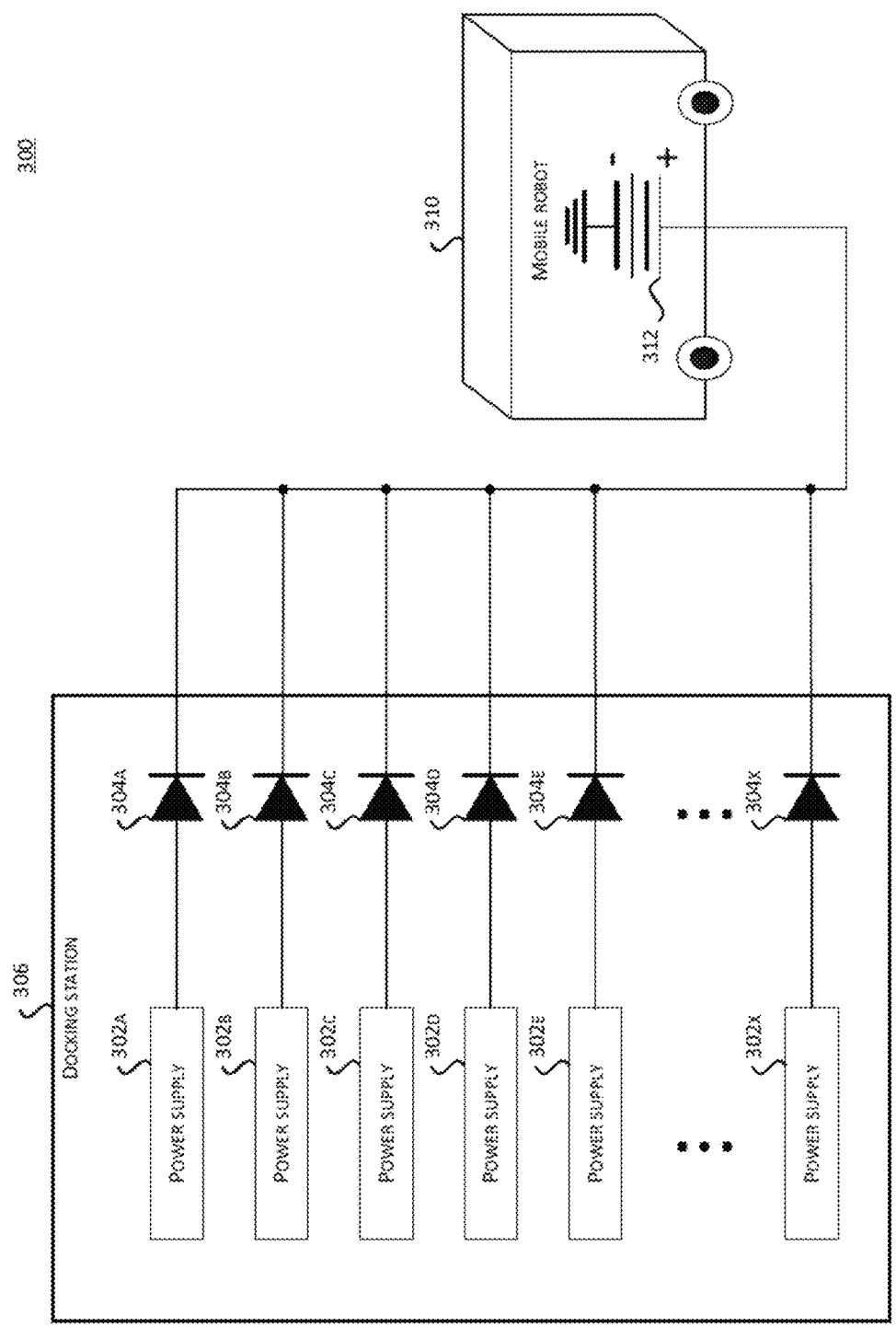
FIG. 3 depicts multiple power supplies for charging a battery of a mobile robot according to some embodiments.

FIG. 3 illustrates an example configuration of a charging system 300 including multiple power supplies according to some embodiments. The charging system 300 may be similar to the charging system 200B of FIG. 2B, but illustratively includes a plurality of power supplies in connection with the battery. Specifically, as shown in FIG. 3, each power supply within the plurality of power supplies (e.g., 302A-302X) provides a current and voltage to a corresponding diode which then provides the current and voltage to a battery of a mobile robot. The plurality of power supplies may, in unison, provide the same current that a conventional power supply may provide. For example, where a conventional power supply provides 12 amps of current, as described herein, in a system with 12 power supplies, each power supply may apply 1 amp of current and the battery may still receive 12 amps of current. By including multiple power supplies, the amount of current supplied by each power supply is varied. Thus, the charging system 300 may be constructed with any number of power supplies and any corresponding current.

The charging system 300 may include a docking station 306 configured to receive a mobile robot 310. In other implementations, the mobile robot 310 may be any other electronic device. The docking station 306 may further include a plurality of power supplies to charge a battery 312 of the mobile robot 310. In some implementations, the mobile robot 310 may include multiple batteries and the plurality of power supplies may be divided among the multiple batteries. For example, a first number of power supplies may be used to charge a first battery of the mobile robot 310 and a second number of power supplies may be used to charge a second battery of the mobile robot 310. In other implementations, the mobile robot 310 may include multiple batteries and the plurality of power supplies may be used to charge the multiple batteries. For example, each of the plurality of power supplies may be used to charge a first battery and a second battery of the mobile robot 310. In some implementations, a battery may be removed from the mobile robot 310 for charging with the docking station 306.

The docking station 306 may include any number of power supplies and corresponding diodes. Specifically, as shown in FIG. 3, the docking station 306 includes X power supplies and X diodes where X may be any number. Each power supply of the docking station 306 (e.g., power supplies 302A, 302B, 302C. 302D, 302E, . . . , 302X) may generate a voltage and current. Each power supply may be connected in parallel with each other power supply. In other implementations, the power supplies may be connected in series or in other configurations. The voltage and current may be generated based at least in part on a voltage and current supplied by another power source (e.g., a wall outlet) to the docking station 306. Each power supply may generate the same voltage and current based on the voltage and/or voltage that the docking station 306 is configured to provide or the mobile robot 310 is configured to receive. Each power supply may generate a fraction of the total current produced by the docking station 306 based on the number of power supplies within the docking station 306. Each power supply may further produce a voltage based on the voltage produced by the docking station 306. For example, where the docking station 306 produces 12 amps and 3 volts and includes 12 power supplies, each power supply may generate 1 amp and 3 volts. In other implementations, power supplies of the plurality of power supplies may generate different currents and/or different voltages. The use of multiple power supplies may enable failover in the event of a failure of one of the power supplies. Further, the decreased current provided by each of the power supplies may decrease the damage caused by a failure of a power supply. Additionally, the use of multiple power supplies can result in a scalable charging system where the number of power supplies can be dynamically scaled up or down. For example, the power supplies may be implemented in three phases and the number of power supplies may be scaled up or down by powers of three.

Each power supply of the plurality of power supplies may further be in electrical communication with a diode of a plurality of diodes (e.g., diodes 304A, 304B, 304C, 304D, 304E, . . . , 304X). As shown in FIG. 3, the plurality of diodes may be included in the docking station 306. In some implementations, the plurality of diodes may be included in a separate device such as an intermediate device or as part of the mobile robot 310. In other implementations, the charging system 300 may not include diodes. Each diode of the plurality of diodes may receive a respective current and voltage from a corresponding power supply and, as previously discussed with reference to FIGS. 2A and 2B, limit the current that passes through the diode during a first time period. Each diode of the plurality of diodes may subsequently enable current to pass through the respective diode during a respective time period.

Each diode may be configured to enable current during a different time period based on a successive enablement of the plurality of power supplies. Prior to and/or upon connection of the docking station 306 with the mobile robot 310, each power supply of the plurality of power supplies may be disabled. Upon connection of the docking station 306 with the mobile robot 310, the plurality of power supplies may be providing little or no current to the plurality of diodes. Upon receiving an indication that the docking station 306 and the mobile robot 310 have been connected, the docking station 306 may enable each of the plurality of power supplies in rapid succession. For example, a first power supply may be enabled at a first time period (e.g., 1 ms), a second power supply may be enabled at a second time period (e.g., 2 ms), a third power supply may be enabled at a third time period (e.g., 3 ms) etc. It will be understood that the power supplies may be enabled in any order and at any time periods. In some embodiments, the time intervals between subsequent enablements of power supplies may vary. For example, the time period between enablement of the first and second power supply may be 5 ms and the time period between enablement of the second and third power supply may be 11 ms. The order of enablements and the time periods between successive enablements may be open loop determinations. In some implementations, the order of enablements and the time periods between successive enablements may be set by a user of the docking station 306 and/or mobile robot 310. For example, the user may manually enable multiple power supplies or the user may set a time period to be utilized between successive enablements of power supplies. Such a successive enablement of the plurality of power supplies may further prevent inrush current from being provided to the mobile robot 310 as one power supply, representing only a fraction of the current of the charging system 300, is enabled at a given time. Therefore, the inrush current provided upon enablement of a power supply of the plurality of power supplies is greatly reduced and, after enablement of each power supply, the charging system 300 is able to maintain a desired current with reduced inrush current.

Upon enablement of a current of a respective power supply of the plurality of power supplies, the current may be transmitted to a battery 312 of the mobile robot 310. The current may be delivered through a wired connection of the docking station 306 and the mobile robot 310. In other implementations, the docking station 306 and the mobile robot 310 may be configured for wireless charging. The successive enablement of power supplies and corresponding enablement of current by diodes can result in the battery 312 receiving successive increases in current until a desired current level has been achieved. The battery 312 may be charged by the docking station 306 during the successive enablement of the power supplies and each successive enablement may result in an increased charging rate of the battery 312.

Stair-Stepping Current

Figure 4:
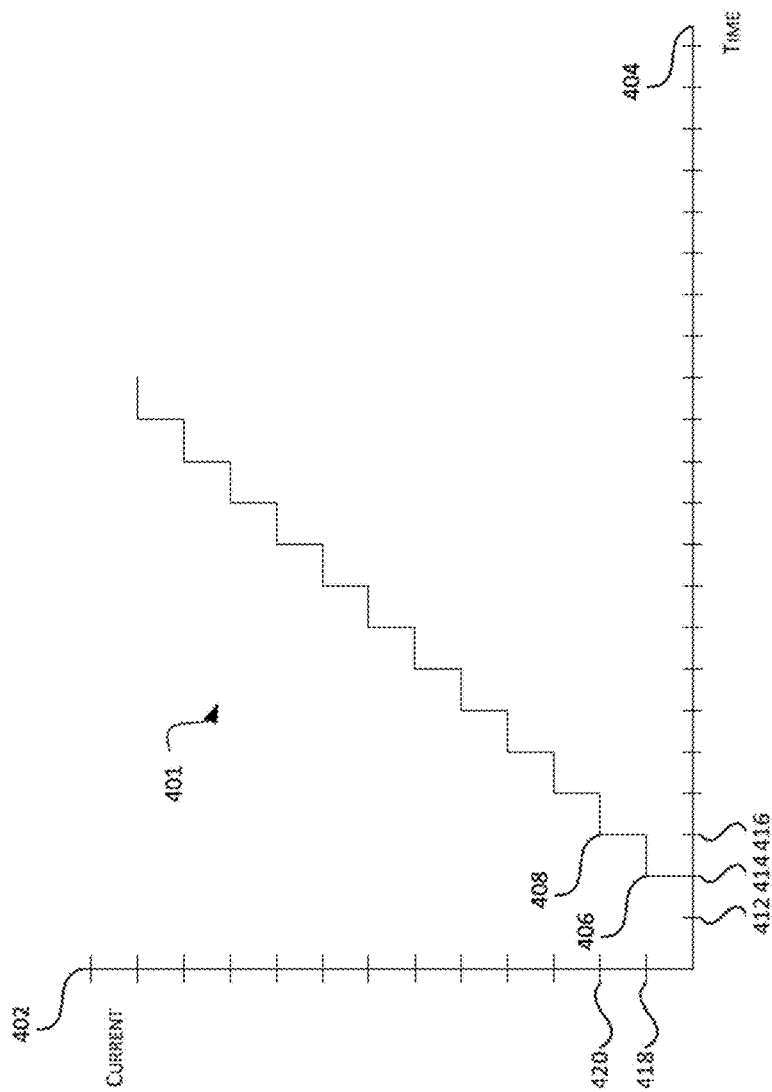
FIG. 4 is a data plot illustrating an embodiment of a charging battery that may be used in the various systems and methods described herein.

FIG. 4 is a data plot 400 illustrating an embodiment a charging battery that may be used in the various systems and methods described herein. The data plot 400 may correspond to the charging system 300 disclosed in FIG. 3. The data plot 400 illustrates an example graph of current that is being provided to a battery over time. The current may be provided by multiple power supplies that are enabled in rapid succession. Each power supply may provide a portion of the total current that is being provided to the battery and the total current may be generated in a "stair-stepping" fashion as seen in FIG. 4. In the example shown in the data plot 400, the battery current 401 is being monitored prior to current being enabled by any of the plurality of the diodes. Further, the battery current 401 is being monitored prior to any of the power supplies being enabled. In the data plot 400, the battery current 401 is being plotted with respect to a current axis 402 and a time axis 404. The current axis 402 may correspond to any unit of current. For example, the current axis 402 may correspond to amps, milliamps (ma), microamps, etc. The time axis 404 may correspond to any unit of time. For example, the time axis 404 may correspond to seconds, milliseconds (ms), microseconds, etc. Further, the ticks on the current axis 402 and/or the time axis 404 may correspond to equal distributions of current and/or time respectively. For example, each tick on the time axis 404 may correspond to one ms. In other implementations, the ticks on the current axis 402 and/or the time axis 404 may correspond to different distributions of current and/or time respectively.

Prior to a first time interval 412 (e.g., one ms), the plurality of power supplies may be disabled and the battery current 401 provided to the battery may be zero. Additionally, prior to the first time interval 412, a docking station, and a device may be connected. Subsequently, at the first time interval 412, a first power supply may be enabled by the docking station and a diode of the first power supply may restrict current from flowing from the first power supply to the battery. At a second time interval 414, a diode corresponding to the first power supply may enable current to pass from the first power supply to the battery and the battery current 401 may be equal to a first current 418 (e.g., 0.3 ma). The first increase in current may correspond to a first step 406 of the stair-stepping current and the first current 418 may be maintained at the battery for a duration of time. Additionally, at the second time interval 414, a second power supply may be enabled by the docking station and a diode of the second power supply may restrict current from flowing from the second power supply to the battery. At a third time interval 416, a diode corresponding to the second power supply may enable current to pass from the second power supply to the battery and the battery current

401 may be equal to a second current 420 (e.g., 6 ma) where the second current 420 corresponds to an increase in current caused by the first power supply plus an increase in current caused by the second power supply. The second increase in current to a second step 408 of the stair-stepping current and the second current 420 may be maintained at the battery for a duration of time. The stair-stepping process may repeat for each of a plurality of power supplies where each power supply corresponds to a step of the stair-stepping process. The number of steps and the corresponding number of power supplies may be based at least in part on the desired current to be provided to the battery. For example, if a greater current is desired, more power supplies may be included in the charging station and, illustratively, more steps may be used in the stair-stepping process.

Figure 5:
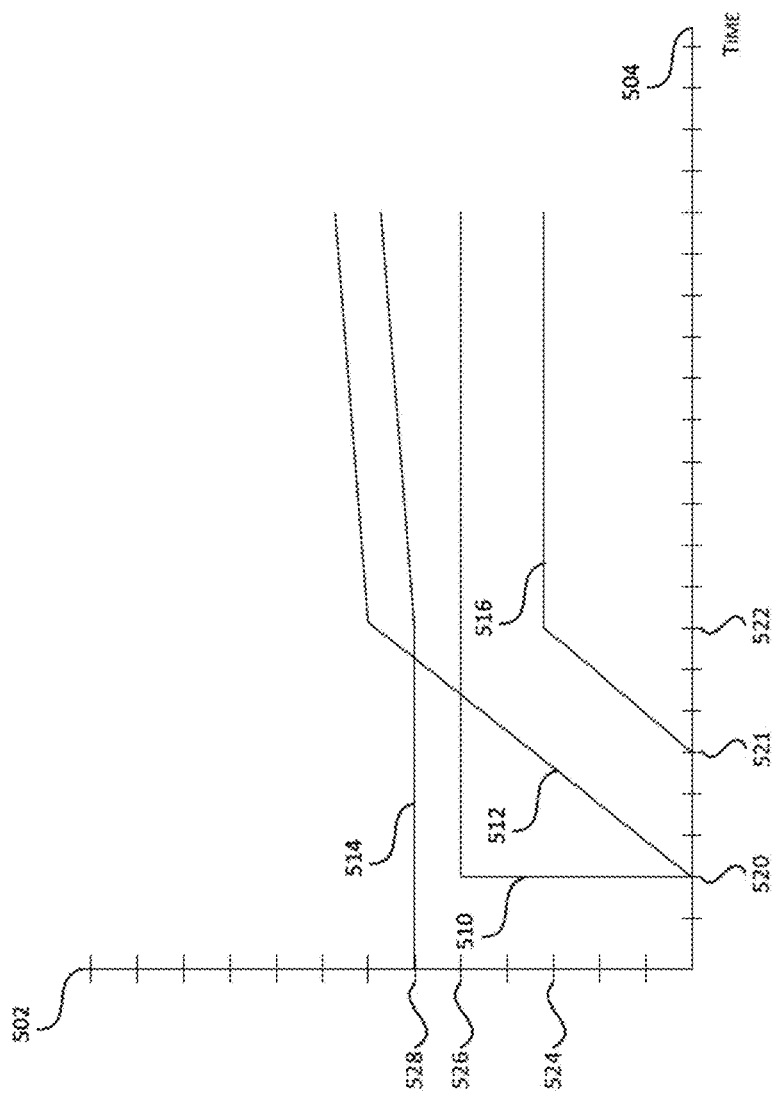
FIG. 5 is a data plot illustrating an embodiment of a charging battery that may be used in the various systems and methods described herein.

In the example of FIG. 4, each power supply corresponds to a uniform increase in current. In some implementations, the increases in current caused by each power supply may be different. For example, a first power supply may correspond to 0.5 amps and a second power supply may correspond to 0.9 amps. Further, in the example of FIG. 4, each power supply is enabled in uniform time periods and each diode enables current in uniform time periods. In some implementations, the time period between enabling of respective power supplies may vary and the time period between enabling of current by diodes may vary. For example, a first power supply may be enabled at 1 millisecond, the diode of the first power supply may enable current at 3 milliseconds, the second power supply may be enabled at four milliseconds, and the diode of the second power supply may enable current at 8 milliseconds Enabling a Power Supply for a Battery FIG. 5 is a data plot 500 illustrating an embodiment of a charging battery that may be used in the various systems and methods described herein. The data plot 500 may correspond to the charging system disclosed in FIG. 2B. The data plot 500 illustrates an example graph of a process for implementing the charging system. The illustrative charging system may include a power supply configured to charge a battery while limiting inrush current. In the example shown in the data plot 500, the battery voltage 514 is being plotted prior to and during charging by the charging system. Further, the battery voltage 514 is being plotted relative to an enablement 510 of the corresponding power supply. Additionally, the power supply voltage 512 and power supply current 516 are being plotted relative to the battery voltage 514. In the data plot 500, each of the enablement 510, the power supply voltage 512, the battery voltage 514, and the power supply current 516 are being plotted with respect to a first axis 502 and a second axis 504. The second axis 504 may correspond to a time axis that may be measured in any unit of time. For example, the second axis 504 may correspond to seconds, milliseconds, microseconds, etc. The first axis 502 may correspond to a voltage axis measuring units of voltage for the enablement 510, the power supply voltage 512, and the battery voltage 514. The first axis 502 may further correspond to a current axis measuring units of current for the power supply current 516. Further, the ticks on the first axis 502 and/or the second axis 504 may correspond to equal distributions of current, voltage, and/or time. For example, each tick on the second axis 504 may correspond to one ms. In other implementations, the ticks on the first axis 502 and/or the second axis 504 may correspond to different distributions of current, voltage, and/or time.

In the example of FIG. 5, at a first time interval 520 (e.g., one ms), the charging system may receive an enablement 510 corresponding to a value 526 indicating for the charging system to enable the power supply. In some instances, the enablement 510 may be equal to zero or represent a logical zero prior to the first time interval 520 and at the first time interval 520, the enablement 510 may be set equal to one or represent a logical one. Further, the enablement 510 may correspond to a voltage value received by the charging system. In response to the enablement 510, at the first time interval 520, the power supply voltage 512 is enabled and begins to initialize. The power supply voltage 512 may increase gradually from zero voltage to a threshold voltage and may begin providing the power supply voltage 512 to a corresponding capacitor. As the power supply voltage 512 is being supplied to a corresponding capacitor, at the first time interval 520, the battery voltage 514 remains at a residual voltage level 528 corresponding to the battery voltage 514 prior to charging by the power supply. The residual voltage level 528 may correspond to any voltage value and, in some implementations, the residual voltage level 528 may correspond to a fully charged battery. Further, at the first time interval 520, the power supply current 516 is equal to zero as the power supply can enable a corresponding capacitor prior to providing any current. In some embodiments, the power supply may not include a corresponding capacitor and the power supply current 516 may be initialized at the first time interval 520.

At a second time interval 521, the capacitor is charged by the power supply and the power supply current 516 begins gradually increasing. The power supply current 516 may increase gradually from zero current to a threshold current 524 and the power supply voltage 512 and power supply current 516 may be provided to a diode. During the interval between second time interval 521 and the third time interval 522, the diode may restrict power supply current 516 from flowing to the battery. Further, the diode may prevent any changes in the battery voltage 514. At the third time interval 522, the diode may enable power supply current 516 to flow from the power supply to battery at the threshold current 524. The threshold current 524 may further correspond to a step of the stair-stepping process as seen in FIG. 4. Further, the battery voltage 514 may begin gradually increasing at the third time interval 522 based on the power supply voltage 512. Thus, the charging system may limit the amount of inrush current provided to the battery during charging.

Figure 6:
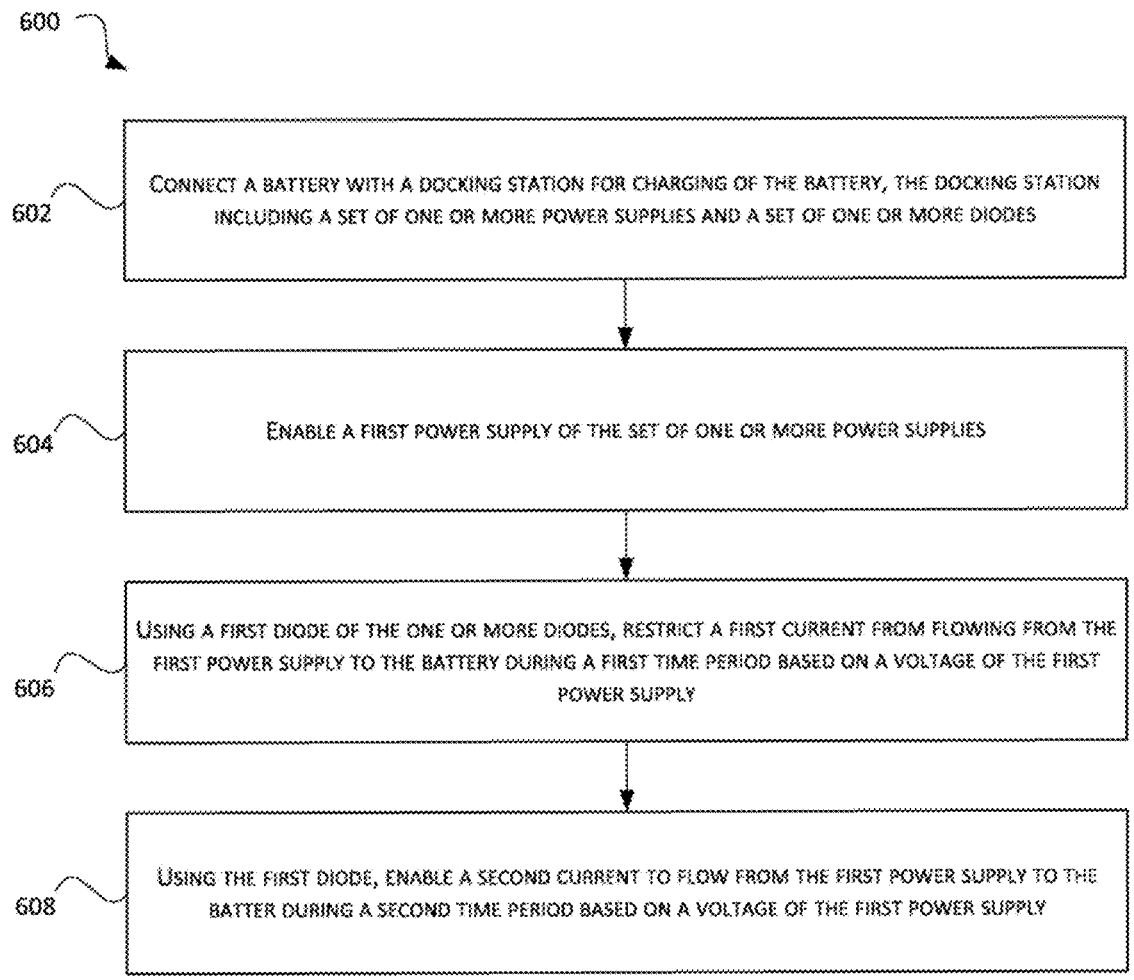
FIG. 6 is a flowchart of an example routine for charging a battery using a docking station according to some embodiments.

FIG. 6 shows a method 60 executed by a charging system utilizing a diode to limit inrush current, according to some examples of the disclosed technologies. The charging system may be similar, for example, to the charging system 300, and may include multiple power supplies similar to (power supplies 302A, 302B, 302C, 302D, 302E, . . . , 302X) and multiple diodes similar to (diodes 304A, 304B, 304C, 304D, 304E, . . . , 304X). The charging system may include a plurality of power supplies and a plurality of diodes where each power supply is connected in series with a respective diode.

In block 602, the charging system receives a battery for charging. The battery may be connected with a docking station in order to charge the battery. The battery may correspond to a larger device such as a mobile robot that is connected with the docking station. The docking station may include one or more power supplies and a set of one or more diodes. Each of the one or more power supplies may be disabled upon connection of the battery with the docking station.

In block 604, the charging system enables a first power supply of the one or more power supplies. The first power supply may be enabled in response to a received input or a user request. In some embodiments, the first power supply may be enabled at a certain time period after the docking station and the battery have been connected. For example, the first power supply may be enabled 3 ms after the connection of the docking station and the battery. Enabling of the first power supply may include allowing the first power supply to generate a voltage and current. In other embodiments, enabling of the first power supply may include enabling a physical connection between the first power supply and a corresponding first diode. Upon enabling of the first power supply, the first power supply may begin generating a voltage and a current.

In block 606, the first power supply generates a voltage and a current and provides the voltage and current to a first diode inline with the first power supply. The first diode restricts the current of the first power supply from flowing from the first power supply to the battery during a first time period based on the voltage of the power supply and corresponding voltage applied at the first diode. For example, the first diode may restrict the current of the first power supply when the voltage of the first power supply is between 0 and 0.7 volts, the voltage of the first power supply corresponding to the first time period.

In block 608, the voltage of the first power supply may gradually increase, and, in response to the voltage of the first power supply, the first diode enables current to flow from the first power supply to the battery during a second time period. For example, the first diode may enable the current of the first power supply when the voltage of the first power supply is greater than 0.7 volts. The voltage of the first power supply further corresponds to the second time period. Subsequently, at the second time period, the battery may begin receiving current and begin charging while limiting inrush current provided to the battery.

Certain Terminology

Terms of orientation used herein, such as "top." "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X. Y. or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

Example Embodiments

A number of nonlimiting example embodiments are provided below that include certain features described above. These are provided by way of example only and should not be interpreted to limit the scope of the description above.

In a 1st embodiment, a system for limiting inrush current during charging of a battery, the system comprising: a set of one or more power supplies, the set of one or more power supplies configured to charge the battery; a docking station configured to removably connect with the battery; and a set of one or more diodes, at least one diode of the set of one or more diodes electronically coupled between a power supply of the set of one or more power supplies and the docking station, the at least one diode configured to: restrict a first current from the power supply to the battery during a first time period based at least in part on a voltage of the power supply; and enable a second current to flow from the power supply to the battery during a second time period based at least in part on the voltage of the power supply.

In a 2nd embodiment, the system of embodiment 1, wherein each power supply of the set of one or more power supplies is disabled prior to a connection of the docking station and the battery.

In a 3rd embodiment, the system of embodiment 2, wherein: a first power supply of the set of one or more power supplies is enabled during a third time period; a second power supply of the set of one or more power supplies is enabled during a fourth time period; and the third time period and the fourth time period occur after the docking station is coupled with the battery.

In a 4th embodiment, the system of embodiment 2, wherein each power supply of the set of one or more power supplies is enabled in succession based at least in part on the connection of the docking station and the battery.

In a 5th embodiment, the system of embodiment 1, wherein each power supply of the set of one or more power supplies comprises a capacitor configured to be charged prior to charging the battery.

In a 6th embodiment, the system of embodiment 1, wherein the at least one diode is further configured to restrict the first current during the first time period based at least in part on a difference between the voltage of the power supply and a voltage of the battery.

In a 7th embodiment, the system of embodiment 6, wherein the at least one diode is further configured to enable the second current during the second time period based at least in part on a difference between the voltage of the power supply and the voltage of the battery.

In an 8th embodiment, the system of embodiment 1, wherein the at least one diode is further configured to restrict a third current from the battery to the power supply during a third time period occurring after the docking station is coupled with the battery.

In a 9th embodiment, the system of embodiment 1, wherein the battery is housed within a mobile robot, the mobile robot configured to dock with the docking station.

In a 10th embodiment, a method for limiting inrush current during charging of a battery, the method comprising: connecting the battery and a docking station, the docking station comprising a set of one or more power supplies configured to charge the battery, the docking station further comprising a set of one more diodes coupled to the set of one or more power supplies; enabling a first power supply of the set of one or more power supplies; restricting, by a first diode of the set of the one or more diodes, a first current from the first power supply to the battery during a first time period based at least in part on a voltage of the first power supply, the first diode electronically coupled between the first power supply and the battery; and enabling, by the first diode, a second current to flow from the first power supply to the battery during a second time period based at least in part on the voltage of the first power supply.

In an 11th embodiment, the method of embodiment 10, wherein each power supply of the set of one or more power supplies is disabled prior to connecting the docking station and the battery.

In a 12th embodiment, the method of embodiment 11, wherein the first power supply of the set of one or more power supplies is enabled during a third time period, the method further comprising: enabling a second power supply of the set of one or more power supplies during a fourth time period, wherein the third time period and the fourth time period occur after connecting the docking station and with the battery.

In a 13th embodiment, the method of embodiment 10, further comprising: enabling each power supply of the set of one or more power supplies in succession based at least in part on connecting the battery and the docking station.

In a 14th embodiment, the method of embodiment 10, wherein each power supply of the set of one or more power supplies comprises a capacitor, the method further comprising: charging a first capacitor of the first power supply prior to providing the first current to the first diode.

In a 15th embodiment, the method of embodiment 10, wherein the restricting of the first current during the first time period is based at least in part on a difference between the voltage of the first power supply and a voltage of the battery.

In a 16th embodiment, the method of embodiment 15, wherein the enabling of the second current during the second time period is based at least in part on a difference between the voltage of the first power supply and the voltage of the battery.

In a 17th embodiment, the method of embodiment 10, further comprising: presenting the first power supply to the battery after connecting the battery and the docking station; and restricting a third current from the battery to the first power supply based at least in part on a voltage of the battery.

In a 18th embodiment, the method of embodiment 10, further comprising: determining the battery is an acceptable battery for the docking station based at least in part on a voltage of the battery.

In a 19th embodiment, a charging apparatus comprising: a set of one or more power supplies, the set of one or more power supplies configured to charge a battery; a docking station configured to removably connect with the battery; and a set of one or more diodes, at least one diode of the set of one or more diodes electronically coupled between a power supply of the set of one or more power supplies and the docking station, the at least one diode configured to: restrict a first current from the power supply to the battery during a first time period based at least in part on a voltage of the power supply; and enable a second current to flow from the power supply to the battery during a second time period based at least in part on the voltage of the power supply.

In a 20th embodiment, the apparatus of embodiment 19, wherein each power supply of the set of one or more power supplies is disabled prior to a connection of the docking station and the battery.

In a 21st embodiment, the apparatus of embodiment 20, wherein: a first power supply of the set of one or more power supplies is enabled during a third time period; a second power supply of the set of one or more power supplies is enabled during a fourth time period; and the third time period and the fourth time period occur after the docking station is coupled with the battery.

Summary

Several illustrative examples of charging systems for mobile robots have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of charging systems for mobile robots and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims. In some embodiments, the drive systems and/or support systems disclosed herein can be used to move other devices or systems different than a mobile robot.

What is claimed is:

1. A system for limiting inrush current during charging of a battery, the system comprising:
   one or more power supplies configured to charge the battery;
   a docking station configured to removably connect with the battery; and
   at least one diode electronically coupled in series between a power supply of the one or more power supplies and an output of the docking station, the at least one diode configured to:
      restrict a first current from flowing from the power supply to the battery via the output of the docking station during a first time period based at least in part on a voltage of the power supply and a voltage of the battery; and
      enable a second current to flow from the power supply to the battery via the output of the docking station during a second time period based at least in part on the voltage of the power supply.

2. The system of claim 1, wherein each power supply of the one or more power supplies is disabled prior to a connection of the docking station and the battery.

3. The system of claim 2, wherein:
   a first power supply of the one or more power supplies is enabled during a third time period;
   a second power supply of the one or more power supplies is enabled during a fourth time period; and
   the third time period and the fourth time period occur after the connection of the docking station and the battery.

4. The system of claim 2, wherein the one or more power supplies are successively enabled based at least in part on the connection of the docking station and the battery.

5. The system of claim 1, wherein each power supply of the one or more power supplies comprises a respective capacitor configured to be charged prior to enablement of the second current.

6. The system of claim 1, wherein the at least one diode is further configured to restrict the first current further based at least in part on a difference between the voltage of the power supply and the voltage of the battery.

7. The system of claim 1, wherein the at least one diode is further configured to enable the second current further based at least in part on a difference between the voltage of the power supply and the voltage of the battery.

8. The system of claim 1, wherein the at least one diode is further configured to restrict a third current from flowing from the battery to the power supply during a third time period occurring after connection of the docking station and the battery.

9. The system of claim 1, wherein the battery is housed within a mobile robot, the mobile robot configured to dock with the docking station.

10. A method for limiting inrush current during charging of a battery, the method comprising:
   connecting the battery and a docking station, the docking station comprising one or more power supplies configured to charge the battery, at least a first diode electronically coupled in series between an output of the docking station and at least a first power supply of the one or more power supplies;
   enabling the first power supply;
   restricting, by the first diode, a first current from flowing from the first power supply to the battery via the output of the docking station during a first time period based at least in part on a voltage of the first power supply and a voltage of the battery; and
   enabling, by the first diode, a second current to flow from the first power supply to the battery via the output of the docking station during a second time period based at least in part on the voltage of the first power supply.

11. The method of claim 10, wherein each power supply of the one or more power supplies is disabled prior to the connecting of the battery and the docking station.

12. The method of claim 11, wherein the first power supply is enabled during a third time period, the method further comprising:
enabling a second power supply of the one or more power supplies during a fourth time period, wherein the third time period and the fourth time period occur after the connecting of the battery and the docking station.

13. The method of claim 10, further comprising:
successively enabling the one or more power supplies based at least in part on the connecting of the battery and the docking station.

14. The method of claim 10, wherein each power supply of the one or more power supplies comprises a respective capacitor, the method further comprising:
charging a first capacitor of the first power supply prior to providing the first current to the first diode.

15. The method of claim 10, wherein the restricting of the first current is further based at least in part on a difference between the voltage of the first power supply and the voltage of the battery.

16. The method of claim 10, wherein the enabling of the second current is further based at least in part on a difference between the voltage of the first power supply and the voltage of the battery.

17. The method of claim 10, further comprising:
presenting the first power supply to the battery after the connecting of the battery and the docking station; and
restricting a third current from flowing from the battery to the first power supply based at least in part on the voltage of the battery.

18. The method of claim 10, further comprising:
determining the battery is an acceptable battery for the docking station based at least in part on the voltage of the battery.

19. A charging apparatus comprising:
one or more power supplies, the one or more power supplies configured to charge a battery;
a docking station configured to removably connect with the battery; and
at least one diode electronically coupled in series between a power supply of the one or more power supplies and an output of the docking station, the at least one diode configured to:
restrict a first current from flowing from the power supply to the battery via the output of the docking station during a first time period based at least in part on a voltage of the power supply and a voltage of the battery; and
enable a second current to flow from the power supply to the battery during a second time period based at least in part on the voltage of the power supply.

20. The charging apparatus of claim 19, wherein each power supply of the one or more power supplies is disabled prior to a connection of the docking station and the battery.

21. The charging apparatus of claim 20, wherein:
a first power supply of the one or more power supplies is enabled during a third time period;
a second power supply of the one or more power supplies is enabled during a fourth time period; and
the third time period and the fourth time period occur after the connection of the docking station and the battery.

* * * * *